UNITED STATES PATENT OFFICE.

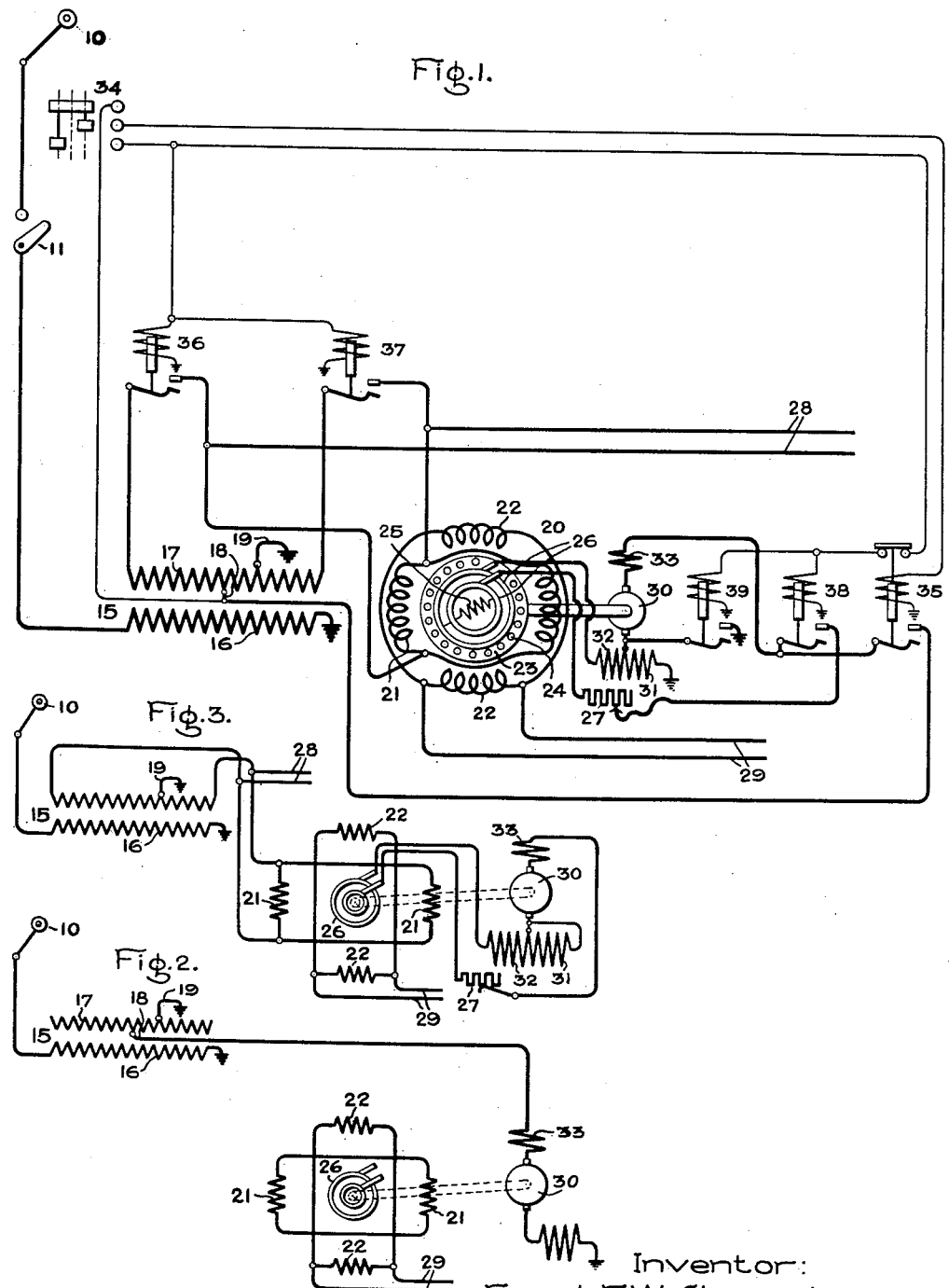

ERNST F. W. ALEXANDERSON, OF SCHENECTADY, NEW YORK, ASSIGNOR TO GENERAL ELECTRIC COMPANY, A CORPORATION OF NEW YORK.

STARTING PHASE-CONVERTERS.

1,300,545. Specification of Letters Patent. Patented Apr. 15, 1919.

Original application filed January 29, 1914, Serial No. 815,280. Divided and this application filed August 7, 1916, Serial No. 113,483. Renewed January 29, 1919. Serial No. 273,929.

*To all whom it may concern:*

Be it known that I, ERNST F. W. ALEXANDERSON, a citizen of the United States, residing at Schenectady, in the county of Schenectady, State of New York, have invented certain new and useful Improvements in Starting Phase-Converters, of which the following is a specification.

My invention relates to the starting of alternating current dynamo-electric machines, and especially to a method of starting and exciting a dynamo-electric machine used as a phase converter.

It is well known that polyphase dynamo-electric machines may be utilized as phase converters by connecting one phase of their armature or primary windings to a single phase source or supply, and then taking polyphase power from all of the windings. Such machines are, however, not self-starting and some means must be provided for bringing them up to speed. It is common also to provide such machines with a field winding by means of which they may be synchronously excited.

My invention relates to the operation of dynamo-electric machines which are not self-starting, and particularly to a novel method and apparatus for starting and exciting a dynamo-electric machine used as a phase converter. Another feature of my invention comprises a novel arrangement for stabilizing the action of a series generator which is used as an exciter for the dynamo-electric machine, and for stabilizing the latter as well as facilitating its falling into step when started.

This application is a division of my application, Serial No. 815,280, filed January 29th, 1914, wherein is described a novel system of control for the utilization of phase converters in supplying current to polyphase motors.

My invention will be more readily understood from the following description, when taken in connection with the accompanying drawing, in which Figure 1 is a diagram showing the apparatus employed and connections used; Figs. 2 and 3 are diagrams showing the resulting connections during the steps of my method.

In the utilization of my invention, power will be supplied from any suitable source, for example, through the trolley 10 and the line switch 11, to the primary winding 16 of a transformer 15. The secondary winding 17 of the transformer is provided with taps 18 and 19, by means of which a reduced voltage may be supplied for a purpose which will later appear. The dynamo-electric machine 20 here used as a phase converter is illustrated as a two-phase machine, provided with primary windings 21 and 22, here shown as mounted upon the stator, and with a secondary member 23 which is provided with a squirrel cage winding 24 and a field winding 25, to which current may be supplied by means of slip rings 26. It will be understood that my invention is equally applicable to a phase converter of any number of phases. Mechanically connected to the rotor of the phase converter 20 is an exciter 30, which is conveniently provided with two field windings 31 and 32 which are wound in opposition, said exciter being also preferably provided with a commutating field winding 33. An adjustable resistance 27 is provided in the circuit of the field winding 25 and I have shown mains 28 and 29 leading from the windings 21 and 22 respectively, by means of which power may be supplied to polyphase motors or other apparatus. The connections necessary for utilizing my invention are preferably effected by means of a controller 34 through the agency of the electromagnetic switches 35 to 39 inclusive.

According to my method of operation, the exciter 30 will first be utilized as a motor, and if the controller 34 be moved to its first position, the winding of the contactor 35 will be energized from the tap 18 of the secondary winding 17. This will effect the connections illustrated in Fig. 2, from which it will be seen that the armature of the exciter 30 is connected in series with the motor field winding 31 and the commutating field winding 33 across the voltage developed between the taps 18 and 19 of the transformer. The exciter will thereupon act as a single phase commutator motor and will rotate the phase converter and bring the same approximately to synchronous speed. After a suitable interval, the controller 34 may be moved to its second position, thereby causing the energization of the windings of the contactors 36 and 37. The closing of these switches will connect the winding 21 of the phase converter across the whole of the secondary winding 17 with the transformer. Since the phase converter has already been started, it will now run as a single-phase induction motor because of the provision of the squirrel-cage winding 24 and drive the exciter 30 as a generator. The movement of the controller to this second position will have caused the deënergization of the winding of the contactor 35, thereby disconnecting the exciter 30 from the source of supply and causing the energization, through an interlock on the contactor 35, of the windings of the contactors 38 and 39. The closure of the contactor 38 will connect the exciter 30 in series with its field windings 32 and 33 and the resistance 27 to the slip rings 26, thereby causing the same to act as a generator and furnish current to the field winding 25 of the phase converter. The closing of the contactor 39 will short-circuit the motor field winding 31. Obviously, the provision of two field windings 31 and 32 which are wound in opposition is not essential but is for convenience of operation, since each winding may then be designed with the desired ampere turns and the desired current carrying capacity. However, by providing a short-circuit around the field winding 31, I make the exciter voltage less sensitive to fluctuations of current, or in other words give the exciter the characteristics of a shunt generator. Any condition of hunting which may exist will, if the exciter is a series generator, induce pulsating currents in the exciter field winding, and these pulsations of the current will result in corresponding pulsations of voltage. These in their turn would increase the original pulsation and might make the operation of the whole apparatus unstable. Such a short-circuit as I have provided will prevent any appreciable pulsations of the field flux and will increase the facility with which the phase converter will be brought into step after an interruption of power. The resulting connections are now illustrated in Fig. 3 from which it will be seen that single phase power is supplied to one winding 21 of the phase converter, thereby causing this machine to run as a single phase induction motor, driving the machine 30 as an exciter.

It should be noted that the exciter is not wholly dependent upon its own residual magnetism for building up its field, but that the induced current in the secondary circuit of the converter, which pulsates slowly with the frequency of slip, will assist in building up the field. After the exciter field has been thus built up, it will furnish sufficient current as a generator to the winding 25 of the converter to draw the same into synchronous speed, which latter will be maintained as long as the machines so run.

Although I have herein described what I now consider to be the preferred form of my invention, I do not wish to be limited to the exact arrangement shown and the method described, but seek to cover in the appended claims all those modifications which come within the true scope and spirit of my invention.

What I claim as new and desire to secure by Letters Patent of the United States, is:

1. The combination with a dynamo-electric machine adapted to operate either as a motor or as a generator and comprising an armature and a plurality of field windings, of means for connecting said armature in series with one of said field windings during the motor operation and for connecting said armature in series with another of said field windings and for short circuiting the first mentioned field winding during the generator operation.

2. In combination, a source of alternating current, a dynamo-electric machine provided with an exciting winding and adapted to be operated from said source, means for starting said machine and thereafter furnishing exciting current thereto, comprising a second dynamo-electric machine mechanically connected to the first machine and provided with two field windings wound in opposition and each adapted to be connected in series with its armature, means for connecting the said second machine to said source of alternating current to drive the same as a motor with one of said field windings in series with the armature, and means for connecting the second machine to the exciting winding of the first machine with the other of said field windings in series with the armature and for short-circuiting said motor field winding.

In witness whereof, I have hereunto set my hand this 5th day of August, 1916.

ERNST F. W. ALEXANDERSON.